United States Patent [19]

Schuster et al.

[11] 4,279,232

[45] Jul. 21, 1981

[54] FUEL SYSTEM FOR INTERNAL COMBUSTION ENGINES

[75] Inventors: Gregor Schuster, Stuttgart; Johann Schmid, Freiberg; Erwin Schmuck, Waiblingen; Klaus Rose, Mundelsheim, all of Fed. Rep. of Germany

[73] Assignee: Robert Bosch GmbH, Stuttgart, Fed. Rep. of Germany

[21] Appl. No.: 966,231

[22] Filed: Dec. 4, 1978

[30] Foreign Application Priority Data

Feb. 3, 1978 [DE] Fed. Rep. of Germany ....... 2804551

[51] Int. Cl.[3] ...................... F02M 37/20; B01D 53/22

[52] U.S. Cl. .................................... 123/516; 123/514; 123/461; 55/159

[58] Field of Search .................. 123/136, 122 R, 514, 123/516, 461, 518; 55/159

[56] References Cited

U.S. PATENT DOCUMENTS

| | | | |
|---|---|---|---|
| 2,120,779 | 6/1938 | Ericson | 123/122 R |
| 2,878,889 | 3/1959 | Gilbert | 123/136 |
| 3,022,053 | 2/1962 | Hoyt | 123/136 |
| 3,492,793 | 2/1972 | Bhuta | 55/159 |
| 3,699,938 | 10/1972 | Frazier | 123/122 R |
| 3,912,468 | 10/1975 | Tsoohiya | 55/159 |
| 3,933,448 | 1/1976 | Di Peri | 55/159 |
| 4,159,698 | 7/1979 | Berenbaum | 123/122 R |

FOREIGN PATENT DOCUMENTS

| | | | |
|---|---|---|---|
| 2126610 | 10/1972 | France | 55/159 |

*Primary Examiner*—Charles J. Myhre
*Assistant Examiner*—Carl Stuart Miller
*Attorney, Agent, or Firm*—Edwin E. Greigg

[57] ABSTRACT

The invention pertains to a fuel system for internal combustion engines in which the unburned, heated fuel which is permitted to flow back to the tank from the fuel metering assembly is deaerated via an apparatus in order to prevent gases from re-entering the fuel supply pump when the fuel is reinduced thereto. By the inclusion of a jet pump between the fuel return line and the induction line, the degree of efficiency of the fuel supply pump is substantially increased.

16 Claims, 4 Drawing Figures

FUEL SYSTEM FOR INTERNAL COMBUSTION ENGINES

BACKGROUND OF THE INVENTION

The invention relates to a fuel system for internal combustion engines having a fuel tank, a fuel pump connected thereto by a conduit, a fuel metering assembly associated with said pump for feeding fuel to said engine and a return conduit extending from said fuel metering assembly to said tank to discharge excess fuel thereto. The unused quantity of fuel flowing back to the fuel tank can become overly heated because of temperatures either within the system or also outside of it. This leads to a breakdown of the fuel into gaseous and more viscous liquid components. Gas bubbles that result from this breakdown of the fuel are a constant problem and can lead to a failure of the fuel being supplied by the pump. However, it is also important that the fuel that contains entrained air be pumped away while still warm, so as not to cause difficulties later when it is cold.

In known fuel systems of this type, the excess fuel quantity is returned without treatment to the supply tank, so that when the quantity of fuel in the tank is at a low level, gas bubbles are easily entrained and fed back into the fuel supply pump.

An apparatus is in fact known, in which the returning fuel flows obliquely into a perpendicularly disposed container from which the induction line of the fuel supply branches off. By means of this return flow into the tank it is possible that the fuel can be virtually entirely consumed. However, in this container no deaeration takes place, since on the contrary, given the high rate of flow into the tank and there being little fuel in the tank, air is additionally carried along by the fuel and mixed therewith.

OBJECT AND SUMMARY OF THE INVENTION

The fuel system according to the invention has the advantage that a substantially complete deaeration of the fuel takes place before the fuel is once again induced by the fuel supply pump. When the return line in addition ends directly before the induction line of the fuel supply pump, particularly in the manner of a jet pump, then even excess fuel quantities in which air is entrained can be taken up directly by the fuel supply pump, and the fuel pump operates at a greater degree of efficiency by exploiting the flow or kinetic energy of the fuel which is being discharged from the return line.

The invention will be better understood as well as further objects and advantages thereof become more apparant from the ensuing detailed description of preferred embodiments taken in conjunction with the drawings.

DESCRIPTION OF THE PREFERRED EMBODIMENTS

Figure 1:
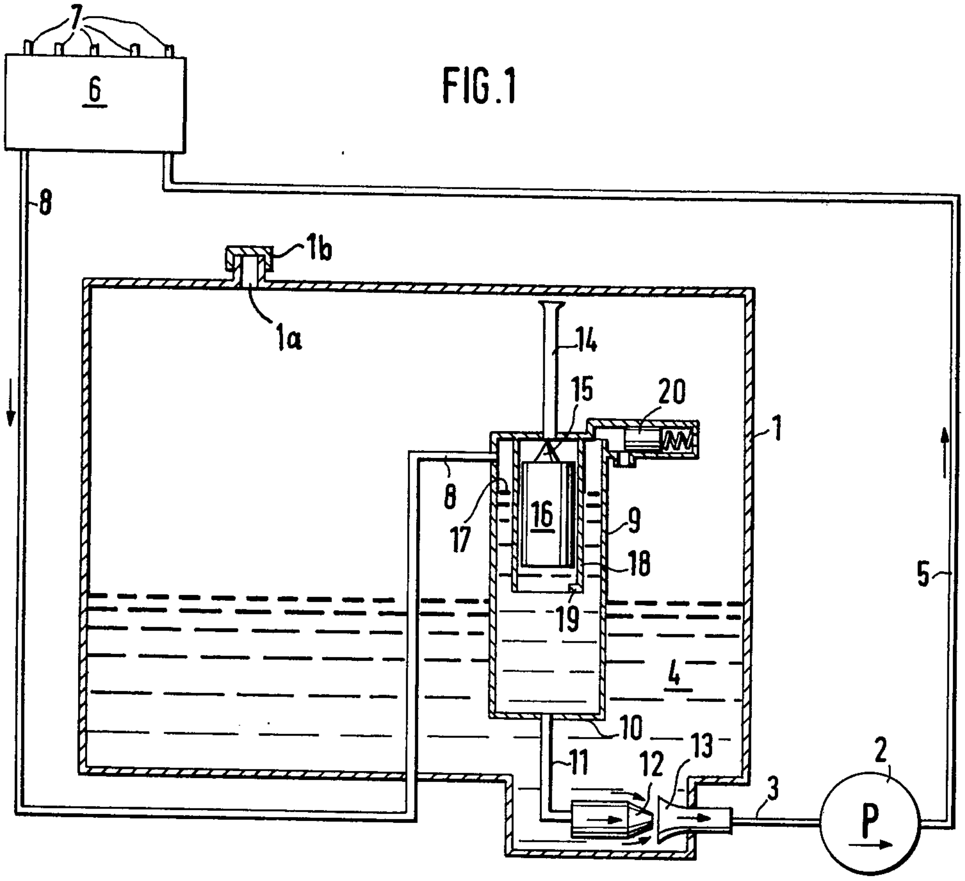
FIG. 1 shows a first exemplary embodiment of the fuel system according to the invention with a float-type controlled deaeration line.

Turning now to FIG. 1, the fuel system according to the invention comprises a fuel tank 1, which includes an upper inlet 1*a*, normally closed by a cap 1*b* through which fuel is periodically admitted to replenish the fuel stored within the fuel tank 1. A fuel supply pump 2 induces fuel 4 via an induction line 3, in order to deliver the fuel 4 via a pressure line 5 to a fuel metering assembly 6. From this fuel metering assembly 6, lines 7 branch off toward the internal combustion engine, leading, for example, to injection nozzles disposed within the intake manifold. A return line 8 also branches off from this fuel metering assembly 6 and empties back into the fuel tank 1. There is a self-contained deaeration container 9 disposed within the fuel tank 1, from the bottom wall 10 of which container a further conduit 11 of the return line 8 branches off and leads to the induction line 3. At the end of the conduit 11 a nozzle 12 is provided which projects into an induction funnel 13 of the induction line 3. The deaeration container 9 is disposed as close as possible to the top of the fuel tank 1, preferably directly beneath the top wall of the tank 1.

As soon as the fuel supply pump 2, which is preferably driven electrically, induces fuel from the fuel tank 1 via the funnel 13, and as soon as fuel then exits via the nozzle 12, a jet pump effect is created which causes the fuel that flows from the deaeration container 9 to carry along with it fuel from the fuel tank 1. The geodetic head prevailing from the deaeration container 9 toward the nozzle 12, augmented if possible by a certain overpressure in this container, effects a flow or kinetic energy at the nozzle 12 which is exploited to improve the output of the fuel supply pump 2.

The deaeration container 9 has a ventilation line 14 which is controllable by means of a movable valve element 15. This movable valve part 15 is connected with a float-type member 16 which, depending on the height of the fuel level 17 in the deaeration container 9, either presses the valve part 15 against its seat, blocking the deaeration line, or else opens the deaeration line, all of which is believed to be clear from the drawing. The valve element 15 and the float 16 are located within a substantially perpendicularly disposed guidance tube 18. The lowermost position of the float 16 is determined by means of a stop 19.

The cross section of the nozzle 12 is adapted in this fuel system to the minimum excess quantity which flows into the deaeration container 9, in order to prevent the container 9 from becoming dry during operation. Should the quantity of fuel greatly increase, for example at low engine rpm and with a corresponding low fuel consumption, then the fuel level in the container 9 rises and the valve element 15 closes. The higher pressure which then establishes itself within the container causes an energy increase at the nozzle 12, which in turn brings about a reduction of the electrical power requirement of the fuel supply pump 2. The pressure in the container 9 is limited by a maximum pressure valve 20.

Figure 2:
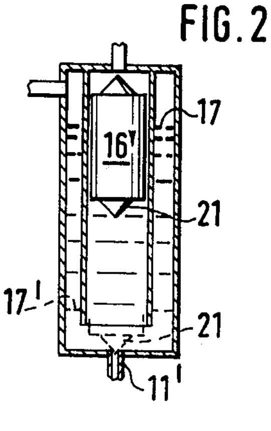
FIG. 2 shows a further embodiment of a float-type valve which differs from that revealed in FIG. 1.

In the view shown in FIG. 2 and in contrast to the system described in the first embodiment, the return line 11' is controllable by another valve element 21, which is also disposed on the float 16'. By this means when the fuel level 17 reaches a critical lower limit in the container 9, the flow from this container is blocked and prevented from reaching the nozzle 12. Thus, in this way the container 9 is prevented from running dry and the possible entry of air or gases into the line 11' and thus into the supply pump 2 is prevented.

The disposition and embodiment of the valve, as well as its actuation, are given purely by way of example. The control of such valves naturally can also be accomplished by electrical, mechanical, or other means, as is known in other fuel systems.

Figures 3, 4:
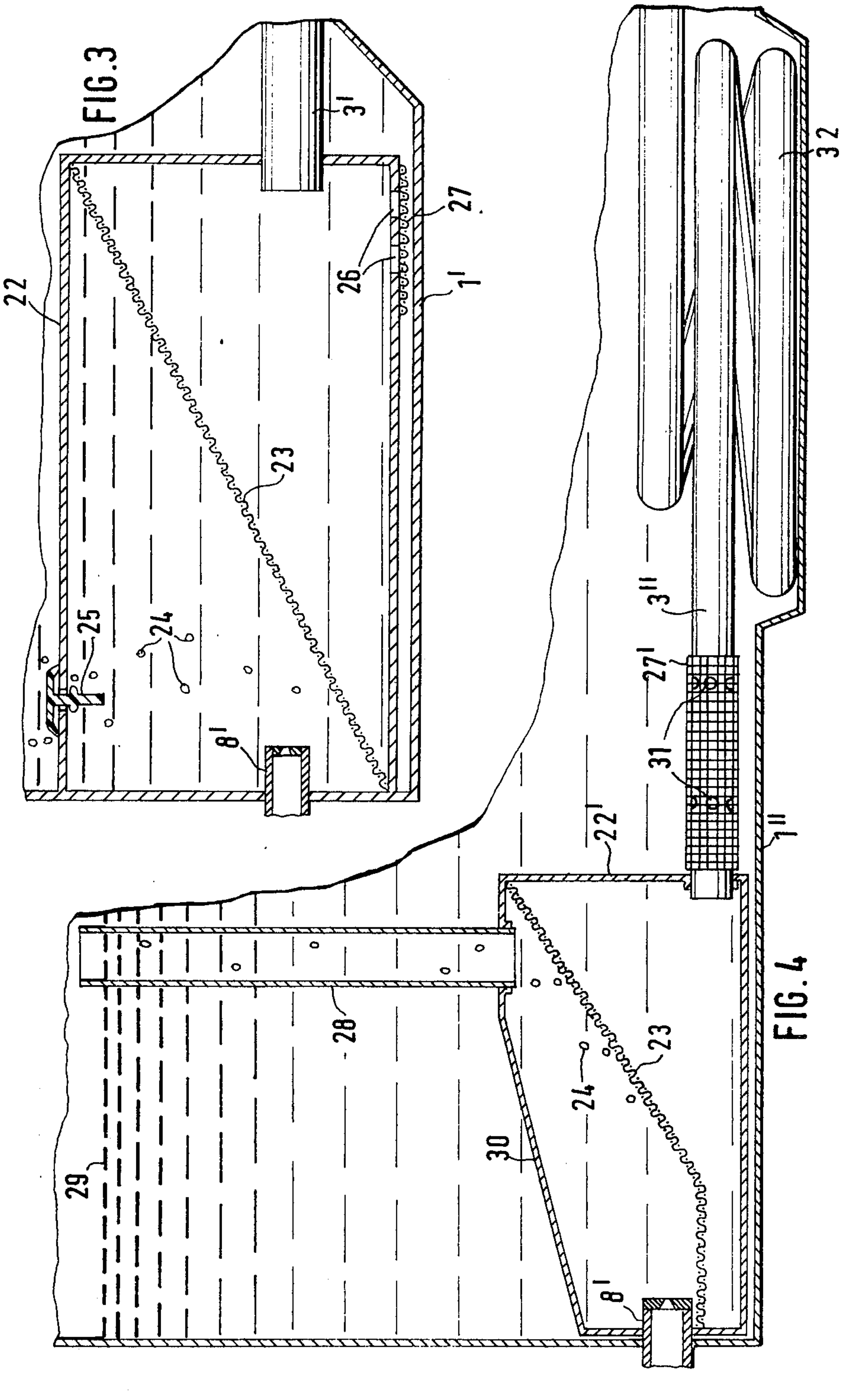
FIG. 3 shows a second exemplary embodiment of the fuel system according to the invention with gas separation accomplished by means of a foraminous element.
FIG. 4 shows further the embodiment shown in FIG. 3.

Relative to the embodiments of this invention shown in FIGS. 3 and 4, a container 22 is provided adjacent to the bottom of the fuel tank 1', into which the return line 8' discharges and from which the induction line 3' branches off. The inlet and discharge portions of this container 22' are separated by a foraminous element 23 for the purpose of filtering out gas bubbles. The bubbles of fuel which collect above the screen-like member 23 out of the returning fuel flow into the upper region of the container 22.

In the embodiment of the invention shown in FIG. 3, air 24 escapes in the form of bubbles via a mushroom-type valve 25 into the fuel tank 1'. The bubbles then reach the upper surface of the fuel, and there dissipate. A plurality of apertures 26 are provided in the bottom of the container 22. In this way make-up fuel is permitted to flow from the fuel tank 1' and replaces the quantity of fuel diverted by the fuel metering assembly 6. A filter or screen element 27 is disposed on the bottom of the container in front of the openings 26. As soon as the fuel level in the fuel tank 1' drops below the height of the top of the container 22, the escaping gas bubbles enter the air space above the fuel surface. In an advantageous manner, however, the container 22 is constantly refilled with fuel through the return line 8', so that the fuel in the tank 1' can be virtually entirely consumed, without gases entering the fuel supply pump 2.

In another embodiment shown in FIG. 4, the gases are directed from the container 22' through a deaeration tube 28 to the air space above the fuel surface 29. In order to attain a corresponding collection of the gas in the region where the tube 28 branches off, the top wall 30 of the container 22 is canted upwardly toward the tube 28, as shown. The subsequent flow of used fuel takes place via bores 31 in the induction line 3'', which are also covered by a screen element 27'. The induction line 3'' is embodied, over its course within the fuel tank 1'', as a cooling coil 32. With such a coil 32 it is possible to pre-treat the fuel so that the lower temperatures which prevail in the bottom of the fuel tank effect an additional cooling of the fuel and cause the resulting condensation to take place before the fuel enters the fuel supply pump 2.

In this last embodiment of the invention, further modifications are conceivable, for example the return line 8' might discharge upwardly at an angle into the container 22 or that the induction line might branch off from the bottom of the container 22, and the like.

The foregoing relates to preferred embodiments of the invention, it being understood that other embodiments and variants thereof are possible within the spirit and scope of the invention, the latter being defined by the appended claims.

What is claimed is:

1. A fuel system for an internal combustion engine comprising:

a fuel tank;

a fuel pump connected to said fuel tank by an induction conduit;

a fuel metering assembly associated with said fuel pump for feeding fuel to said engine;

a return conduit extending from said fuel metering assembly to said fuel tank to discharge excess fuel thereto;

deaeration means included in said return conduit for deaerating said excess fuel, said deaeration means comprising a container positioned in said fuel tank, said container having an upper wall and air discharge means correlated therewith to permit air to flow therethrough; and fuel discharge means to permit make-up fuel from said fuel tank and deaerated excess fuel from said container to flow into said induction conduit, said fuel discharge means including first inlet means for admitting deaerated excess fuel from said container, second inlet means for admitting make-up fuel from a lower portion of said fuel tank to replace fuel supplied to said engine, and outlet means for discharging a mixture of said deaerated excess fuel and said make-up fuel into said induction conduit.

2. A fuel system, as claimed in claim 1, wherein said air discharge means includes a valve element.

3. A fuel system, as claimed in claim 2, further wherein said upper wall is perforated and said air discharge means includes a conduit extending through said upper wall, said conduit being arranged to permit air to pass therethrough into said fuel tank.

4. A fuel system, as claimed in claim 1, further wherein said container includes a self-contained deaeration element.

5. A fuel system, as claimed in claim 4, further wherein said self-contained deaeration element includes said air discharge means, which has a valving means arranged to discharge air into said fuel tank.

6. A fuel system, as claimed in claim 5, further wherein said valving means includes a float element.

7. A fuel system, as claimed in claim 5, further wherein said deaeration element has a perforated lower wall and said fuel discharge means includes a jet nozzle and conduit means arranged in said perforated lower wall to feed deaerated excess fuel to said jet nozzle.

8. A fuel system, as claimed in claim 6, further wherein said float element of said valving means cooperates with a perforation in a lower wall of said deaeration element to control fuel feed to a jet nozzle.

9. A fuel system, as claimed in claim 7, which wherein said fuel discharge means further comprises:

a funnel-like member having a large open end disposed within said fuel tank and a small opposite end connected to said induction conduit, wherein said jet nozzle projects into said large open end and is spaced from said funnel-like member to define therebetween a fuel passage from said fuel tank to said funnel-like member.

10. A fuel system, as claimed in claim 1, further wherein said container includes a screen element and said return conduit discharges said excess fuel in proximity to said screen element.

11. A fuel system, as claimed in claim 10, further wherein said screen element divides said container into several sections comprising an inlet section which is connected with said return conduit and said air discharge means and a discharge section which is connected with said fuel discharge means.

12. A fuel system, as claimed in claim 11, further wherein said fuel discharge means includes a discharge line connected between said container discharge section and said induction conduit.

13. A fuel system, as claimed in claim 12, further wherein said discharge line includes a cooling coil disposed within said fuel tank.

14. A fuel system, as claimed in claim 12, further wherein said fuel discharge means includes fuel passage means, defined by a lower wall portion of said container, for permitting fuel to flow from said fuel tank into said container discharge section, to replace fuel supplied to the engine.

15. A fuel system, as claimed in claim 14, further wherein said fuel passage means includes a filter element.

16. A fuel system, as claimed in claim 12, further wherein:

said discharge line defines fuel passage means, disposed intermediate the connection of said discharge line with said container discharge section and the connection of said discharge line with said induction conduit, for permitting fuel to flow from said fuel tank into said discharge line.

* * * * *